United States Patent
Tanaka et al.

(10) Patent No.: US 6,797,783 B1
(45) Date of Patent: Sep. 28, 2004

(54) MODIFIED NATURAL RUBBER

(75) Inventors: Yasuyuki Tanaka, Hachioji (JP); Naoya Ichikawa, Akashi (JP); Toshiaki Sakaki, Kakogawa (JP); Yuichi Hioki, Wakayama (JP); Masaharu Hayashi, Wakayama (JP)

(73) Assignees: Kao Corporation, Tokyo (JP); Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 08/941,132

(22) Filed: Sep. 30, 1997

Related U.S. Application Data

(63) Continuation of application No. 08/448,990, filed on May 24, 1995, now abandoned.

(51) Int. Cl.[7] .............................................. C08F 255/06
(52) U.S. Cl. ..................................................... 525/315
(58) Field of Search ........................................ 525/315

(56) References Cited

U.S. PATENT DOCUMENTS

| | | | | |
|---|---|---|---|---|
| 2,097,481 A | * | 1/1937 | Wallerstein | ................. 435/267 |
| 4,208,490 A | * | 6/1980 | Kondo | ....................... 525/243 |
| 4,528,340 A | * | 7/1985 | Hayashi | ...................... 525/379 |
| 5,089,557 A | * | 2/1992 | Henton | ......................... 525/66 |
| 5,115,021 A | * | 5/1992 | Blythe | ........................... 525/84 |
| 5,118,546 A | * | 6/1992 | Burlett | ....................... 428/36.8 |
| 5,189,108 A | * | 2/1993 | Imai | ............................ 525/285 |
| 5,834,563 A | * | 11/1998 | Kimura | ...................... 525/319 |

FOREIGN PATENT DOCUMENTS

| | | | |
|---|---|---|---|
| EP | 0584597 | * | 3/1994 |
| GB | 2098222 | * | 11/1982 |

* cited by examiner

*Primary Examiner*—Bernard Lipman
(74) *Attorney, Agent, or Firm*—Birch, Stewart, Kolasch & Birch, LLP

(57) ABSTRACT

A modified natural rubber is disclosed, which is obtained by modifying a deproteinized natural rubber having a nitrogen content of less than 0.10% by weight. A process for improving the graft ratio and the graft efficiency of natural rubber and a process for improving the epoxidation ratio of natural rubber are also disclosed. The modified natural rubber of the present invention has a high modifying efficiency and thus shows an excellent modifying effect. It is also useful as a means for preventing allergy.

4 Claims, No Drawings

MODIFIED NATURAL RUBBER

This application is a continuation of Ser. No. 08/448,890 filed May 24, 1995 now abandoned.

FIELD OF THE INVENTION

The present invention relates to a modified natural rubber obtained by using a deproteinized natural rubber which is substantially free from any protein, a process for improving the graft ratio and the graft efficiency of natural rubber, and a process for improving the epoxidation ratio of natural rubber without gel formation.

BACKGROUND OF THE INVENTION

Natural rubber has been widely employed in industrial articles such as automobile tires, belts and adhesives and domestic articles such as gloves.

In addition to its excellent mechanical properties as vulcanized rubber, natural rubber is much superior in the raw rubber strength (green strength) to synthetic rubbers. Accordingly, natural rubber is excellent in processing characteristics in kneading, sheeting and various molding procedures. In the form of a latex, natural rubber has a high gel strength at solidification and thus can be easily a formulated into a film, which makes natural rubber applicable to various products including condoms, surgical gloves and diverse catheters.

However, natural rubber cannot compete successfully with synthetic rubbers which have specific characteristics, for example, butyl rubber having a high gas permeability or nitrile rubber being excellent in oil resistance.

Therefore, attempts have been made to modify natural rubber so as to impart the characteristics of other rubbers thereto while maintaining the excellent mechanical properties and film-forming properties of the natural rubber. Examples of known modification methods include graft copolymerization with an organic compound having an unsaturated bond and epoxidation. In the graft copolymerization with an organic compound having an unsaturated bond, there have been employed methyl methacrylate, styrene, acrylonitrile, etc. as a monomer. Among these there has been marketed a graft copolymerization product of natural rubber with methyl methacrylate as "MG Latex".

In general, natural rubber is modified by these treatments in the state of a latex stabilized with a surfactant by taking the cost and the easiness in handling into consideration, though a solid rubber or a rubber solution is subjected to these treatments in some cases.

However, a natural rubber latex just collected from a rubber tree usually contains about 5% of non-rubber components including proteins. Also, a commercially available concentrated latex contains about 3% of non-rubber components. Thus, there arises a problem that these non-rubber components, in particular, proteins inhibit the modification of natural rubber and, in the case of graft copolymerization, the graft ratio and the graft efficiency are lowered, which makes it impossible to achieve a high modifying effect.

On the other hand, it has been recently reported in United States that medical instruments with the use of natural rubber such as surgical gloves, various catheters and anesthetic masks cause dyspnoea or anaphylactoid symptoms (for example, angioedema, urticaria, collapse, cyanosis). It has been also reported that female patients with allergic anamnesis suffered from hand ache, urticaria and angioedema around eyes due to the use of household natural rubber gloves.

It is assumed that these symptoms are caused by the proteins contained in natural rubber. It has been therefore required to eliminate the proteins from natural rubber products. These problems accompany not only natural rubber products but also modified natural rubbers obtained by modifying the natural rubber.

In addition, natural rubber has another disadvantage that the material properties thereof vary depending on the production area and production time, which is a problem characteristic of natural products. Therefore, the elimination of the non-rubber components causing this problem makes the vulcanizing characteristics stable. Thus natural rubber becomes a material rubber having stable qualities comparable to synthetic rubbers. In addition, the mechanical accuracies of modified natural rubber products can be elevated.

There have been marketed in practice crepe H, crepe G and crepe CD as a deproteinized natural rubber.

The protein content of natural rubber is generally expressed in an amount corresponding to 6.3 times as much as its nitrogen content which is determined by the Kjeldahl method. According to the present inventors' examination, the nitrogen content of a fresh natural rubber latex (field latex) ranges from about 0.5 to 0.9% by weight, while those of a marketed refined latex and raw rubber (smoked sheet rubber) are about. 0.3% by weight or above. Although the protein contents of the conventional deproteinized natural rubbers are remarkably lower, the nitrogen content of crepe CD, which has the lowest protein content, is still about 0.11% by weight. Thus, they are not completely deproteinized yet and, therefore, cannot elevate the modification efficiency. Also they are unsatisfactory as a material for preventing allergy.

SUMMARY OF THE INVENTION

An object of the present invention is to provide a modified natural rubber which has been modified at a high efficiency and a process for producing the same.

Another object of the present invention is to provide a modified natural rubber having no allergy causing potential.

Still another object of the present invention is to provide a process for improving the graft ratio and the graft efficiency of natural rubber and a process for improving the epoxidation ratio of natural rubber.

The modified natural rubber of the present invention for achieving the above-mentioned object is one obtained by a modification of a deproteinized natural rubber having a nitrogen content of less than 0.10% by weight.

The process for improving the graft ratio and the graft efficiency of a graft-copolymerized natural rubber comprises deproteinizing natural rubber and then graft-copolymerizing the natural rubber.

The process for improving the epoxidation ratio of an epoxidized natural rubber comprises deproteinizing natural rubber and then epoxidizing the natural rubber.

DETAILED DESCRIPTION OF THE INVENTION

The use of a deproteinized natural rubber having a nitrogen content of less than 0.10% by weight makes it possible to efficiently modify the natural rubber and, as a result, to give a high modifying effect.

The modified natural rubber according to the present invention includes those obtained through graft copolymerization of the above-mentioned deproteinized natural rubber with an organic compound having an unsaturated bond and those obtained through epoxidation.

Other examples of the modified natural rubber according to the present invention include those obtained through halogenation (e.g., chlorination), hydrochlorination, cyclization or hydrogenation of the deproteinized natural rubber.

It is preferable that the natural rubber to be modified has a nitrogen content of less than 0.05% by weight, more preferably less than 0.02% by weight.

It is generally known that natural rubber is a mixture of high molecular weight components of 1,000,000 to: 2,500,000 in molecular weight and low molecular weight components of 100,000 to 200,000 therein. It is assumed that the low molecular weight components are bound to each other via abnormal groups (mainly comprising peptide molecules) contained in the natural rubber and branched, thus forming the high molecular weight components. When a peptide molecule (i.e., a nitrogen atom of an atomic weight of 14) is bound to one molecule of a low molecular weight rubber of a molecular weight 100,000 which has been seemingly formed by the inherent biosynthesis, then the nitrogen content becomes 0.014%. It is, therefore, considered that nitrogen in the amount corresponding to this value is not eliminated but remains. Accordingly, it is unavoidable that about 0.02% or below of nitrogen remains. Thus, it is regarded that a natural rubber which has been deproteinized to a nitrogen content of less than 0.02% has been almost completely deproteinized.

In the present invention, the almost completely deproteinized natural rubber does not give an absorption at 3280 $cm^{-1}$ in the infrared absorption spectrum. Therefore, it is preferable to employ an analytical means with the use of the infrared absorption spectrum in order to more exactly confirm the completion of the deproteinization.

Examples of the deproteinized natural rubber to be used in the present invention include deproteinized natural rubbers as disclosed, for example, in JP-A-6-56902 (the term "JP-A" as used herein means "unexamined published Japanese Patent Application") and JP-A-6-56903 (all corresponding to EP-A-0 584 597). These deproteinized natural rubbers can be produced by adding a protease or a bacterium to a latex to thereby decompose proteins or repeatedly washing a latex with a surfactant such as a soap. Among all, deproteinized natural rubbers produced by a method comprising simultaneously or successively treating a latex with a protease and a surfactant as disclosed, for example, in JP-A-6-56904, JP-A-6-56905 and JP-A-6-56906 (all corresponding to EP-A-0 584 597) may preferably be employed.

The latex to be used as a starting material for producing the deproteinized natural rubber may be either a marketed ammonia-treated latex or a field latex.

The above-mentioned protease is not particularly restricted. Although proteases originating in bacteria, fungi or yeasts may be used, it is preferable to use those originating in bacteria.

The surfactant usable herein may be selected from anionic surfactants, nonionic ones and combinations thereof. Suitable examples of the anionic surfactants include carboxylic acid surfactants, sulfonic acid surfactants, sulfate surfactants and phosphate surfactants, while suitable examples of the nonionic surfactants include polyoxyalkylene ether surfactants, polyoxyalkylene ester surfactants, polyhydric alcohol fatty acid ester surfactants, sugar fatty acid ester surfactants and alkylpolyglycoside surfactants.

To deproteinize a natural rubber latex with a protease, it is preferable that the protease is used in an amount of from 0.001 to 10% by weight based on the field latex or the ammonia-treated latex.

Although the period of time for the treatment of the latex with the protease is not particularly restricted, it is preferable to perform the treatment for several minutes to 1 week. The latex may be stirred or allowed to stand without stirring. The treating temperature may be controlled, if necessary, to at from 5 to 90° C., preferably at from 20 to 60° C. When the temperature exceeds 90° C., the protease tends to be inactivated quickly when the temperature is lower than 5° C., on the other hand, the enzymatic reaction hardly proceeds.

To wash latex particles with a surfactant, it is adequate to add the surfactant to the latex after the completion of the enzymatic treatment followed by centrifugation. In this case, the surfactant may be added; appropriately in an amount of from 0.001 to 10% by weight based on the latex. As an alternative to the centrifugation, the rubber particles may be aggregated and separated. The centrifugation may be performed once to several times. In the step of washing, a synthetic rubber or a synthetic rubber latex may be incorporated to the natural rubber latex.

In accordance with the present invention, the modification of the deproteinized natural rubber may be carried out by graft copolymerization or epoxidation, for example.

The graft copolymerization of the deproteinized natural rubber may be carried out by adding an organic compound having an unsaturated bond to the deproteinized natural rubber and reacting them in the presence of an appropriate initiator. Examples of the organic compound having an unsaturated bond include monomers capable of undergoing graft copolymerization, e.g., methacrylic acid, acrylic acid and derivatives thereof such as methyl methacrylate, methyl acrylate and 2-hydroxyethyl methacrylate, acrylonitrile, vinyl acetate, styrene, acrylamide and vinylpyrrolidone. Prior to the addition of the organic compound having an unsaturated bond to the deproteinized natural rubber, an emulsifier may be added to the natural rubber. Alternatively, the organic compound having an unsaturated bond is emulsified and then added to the deproteinized natural rubber. It is preferable to use a nonionic surfactant as the emulsifier, though it is not restricted thereto.

The organic compound having an unsaturated bond is added usually in an amount of from 5 to 100 parts by weight, preferably from 10 to 50 parts by weight, per 100 parts by weight of the rubber particles in the deproteinized natural rubber. When the amount of the organic compound having an unsaturated bond exceeds the upper limit of the range as specified above, a homopolymer is formed in an increased amount and thus the graft efficiency is lowered. When the amount is smaller than the lower limit, on the contrary, the organic compound having an unsaturated bond participates in the graft polymerization in an excessively small amount and thus only a poor modifying effect is achieved. Thus, these cases are both undesirable.

Examples of the initiator include peroxides such as benzoyl peroxide, hydrogen peroxide, cumene hydroperoxide, tert-butyl hydroperoxide, di-tert-butyl peroxide, 2,2-azobisisobutyronitrile and potassium persulfate. It is particularly preferable to use a redox initiator, since the polymerization temperature can be lowered thereby. Examples of the reducing agent to be combined with a peroxide in such a redox initiator include tetraethylenepentamine, mercaptans, acidic sodium sulfite, reducing metal ions and ascorbic acid. Examples of a preferable combination of the redox initiator include tert-butyl hydroperoxide with tetraethylenepentamine, hydrogen peroxide with an $F^{2+}$ salt and $K_2SO_4O_8$ with $NaHSO_3$.

The initiator may be added in an amount of from 0.3 to 10% by mol, preferably from 0.5 to 1% by mol, per 100 mol of the organic compound having an unsaturated bond.

These components are fed into a reactor and reacted therein at 30 to 80° C. for 2 to 10 hours. Thus a graft copolymer can be obtained.

The deproteinized natural rubber to be used herein may be in the form of a latex, a rubber solution or a solid rubber.

The graft copolymer of the deproteinized natural rubber thus obtained (i.e., the graft-copolymerized natural rubber) has a high graft ratio and a high graft efficiency. Thus, it exhibits excellent properties-such as adhesiveness while sustaining its strength, which makes it, highly useful in, for example, adhesives. The graft ratio as used herein means the weight ratio of graft-polymerized monomers to main chain polymer and it ranges from about 15 to 25% in case of a conventional graft-copolymerized natural rubber while the graft efficiency as used herein means the weight ratio of graft-polymerized monomers to the total polymerized monomers and it ranges from about 40 to 60% in case of a conventional graft-copolymerized natural rubber.

The epoxidation of the deproteinized natural rubber in the present invention may be carried out by using an organic peracid. Examples of the organic peracid include perbenzoic acid, peracetic acid, performic acid, perphthalic acid, perpropionic acid, trifluoroperacetic acid. and perbutyric acid. Although such an organic peracid may be added directly to the deproteinized natural rubber, it is preferable to add two components for forming the organic peracid to the deproteinized natural rubber to form thereby the organic peracid which is then reacted with the deproteinized natural rubber. When performic acid is to be formed, for example, formic acid and hydrogen peroxide are successively added to the deproteinized natural rubber. In the case of peracetic acid, glacial acetic acid and hydrogen peroxide are successively added and reacted.

In usual, the organic peracid is added in an amount of from 10 to 100 parts by weight, preferably from 20 to 70 parts by weight, per 100 parts by weight of the rubber particles in the deproteinized natural rubber. When two components for forming the organic peracid are to be added, the amounts of these additives are controlled so as to adjust the amount of the organic peracid thus formed to be within the range as specified above.

In case where the deproteinized natural rubber in the form of a latex is to be epoxidized, it is preferable that the latex is stabilized by adding an emulsifier such as a nonionic one thereto and maintaining the pH value thereof around the neutrality (about pH 5 to 7) in advance of the addition of the organic peracid or components for forming the same to the latex.

The epoxidation is usually performed by reacting the reactants at a temperature of 5 to 60° C. for 3 to 10 hours.

Similar to the above-mentioned case of graft polymerization, the deproteinized natural rubber to be used herein may be in the form of a latex, a rubber solution or a solid rubber.

The epoxidation product of the deproteinized natural rubber thus obtained (i.e., the epoxidized natural rubber) has a high epoxidation ratio and a low gel content. Therefore, it exhibits excellent properties including the oil resistance and the gas permeability while sustaining its strength and processability, which makes it highly useful in, for example, hoses and inner liner of tires. The epoxidation ratio as used herein means the conversion ratio of unsaturated bonds into epoxy groups and it ranges from about 50 to 70% in case of a conventional epoxidized natural rubber.

To further illustrate the modified natural rubber of the present invention in greater detail, the following Referential Examples and Examples will be given.

REFERENTIAL EXAMPLE 1

Alkalase 2.0 M (manufactured by Novo Nordisk Bioindustry) was used as a protease and a natural rubber latex of a solid content of 60.2% (manufactured by Soctek, Malaysia) was used as a natural rubber latex.

15 ml of the natural rubber latex was diluted with: 200 ml of distilled water and stabilized with 0.12% of sodium naphthenate. Then, it was adjusted to pH 9.2 by adding sodium dihydrogen phosphate. Separately, 0.78 g of Alkalase 2.0 M was dispersed in 10 ml of distilled water and then added to the above-mentioned diluted natural rubber latex. After adjusting the pH value to 9.2 again, the latex was maintained at 37° C. for 24 hours. After the completion of the enzymatic treatment, a nonionic surfactant Emulgen™ 810 (manufactured by Kao Corporation) was added to the latex at a concentration of 1%, followed by the centrifugation of the latex at 11,000 rpm for 30 minutes. The creamy fraction thus formed was dispersed again in 200 ml of distilled water containing 1% of Emulgen 810 (see above) and then centrifuged again. After repeating this procedure thrice, a definite amount of the creamy dispersion was dispersed in distilled water to give thereby a deproteinized rubber latex.

This deproteinized rubber latex was casted onto a glass plate and dried at room temperature. Then, the film thus obtained was dried in vacuo at room temperature.

The nitrogen content of the obtained film was analyzed by the RRIM test method (Rubber Research Institute of Malaysia (1973), 'SMR Bulletin NO. 7'). Regarding the infrared absorption spectrum, a film was formed on a KBr disk and the absorbance was determined with a Fourier transformation infrared spectrometer JASCO 5300.

As a result, the nitrogen content of the solid rubber obtained above was less than 0.008%. The infrared absorption spectrum thereof showed an absorption at 3320 $cm^{-1}$ assignable to short-chain peptides or amino acids but none at 3280 $cm^{-1}$ assignable to high molecular weight polypeptides.

REFERENTIAL EXAMPLE 2

As a natural rubber latex, a marketed latex of high ammonia type (manufactured by Guthrie, Malaysia) was used. The solid rubber content of this latex was 62.0%.

The above-mentioned natural rubber latex was diluted with a 0.12% aqueous solution of sodium naphthenate in such a manner as to give a solid rubber content of 10% by weight. Then, the latex was adjusted to pH 9.2 by adding sodium dihydrogen phosphate and Alkalase 2.0 M was added at a ratio of 0.87 g per 10 g of rubber components. After adjusting the pH value to 9.2 again, the latex was maintained at 37° C. for 24 hours.

After the completion of the enzymatic treatment, a 1% aqueous solution of a nonionic surfactant Emulgen 810 (see above) was added to the latex to adjust thereby the rubber concentration to 8%, followed by the centrifugation of the latex at 11,000 rpm for 30 minutes. The creamy fraction thus formed was dispersed again in a 1% aqueous solution of Emulgen 810 (see above) and the rubber concentration was adjusted to about 8%, followed by the centrifugation again. The centrifugation was repeated once more and the cream thus obtained was dispersed in distilled water. Thus, a deproteinized rubber latex of a solid rubber content of 60% was obtained.

The nitrogen content of a raw rubber obtained from this latex was 0.05%. Its infrared absorption spectrum showed an absorption at 3320 $cm^{-1}$ but none at 3280 $cm^{-1}$.

REFERENTIAL EXAMPLE 3

The enzymatic treatment was completed in the same manner as the one described in the above Referential Example 2. Then, a 1% aqueous solution of a nonionic surfactant Emulgen 810 (see above) was added to the latex to adjust thereby the rubber concentration to 8%, followed by the centrifugation of the latex at 11,000 rpm for 30 minutes. The cream thus obtained was dispersed in distilled water. Thus, a deproteinized rubber latex of a solid rubber content of 60% was prepared.

The nitrogen content of a raw rubber obtained from this latex was 0.1%. Its infrared absorption spectrum showed an absorption at 3320 cm$^{-1}$ but none at 3280 cm$^{-1}$.

EXAMPLE 1

Production of Graft-copolymerized Natural Rubber 300 g of the deproteinized natural rubber latex (solid content: 60%) obtained in the above Referential Example 1 was fed into a four-necked flask equipped with a stirrer, a dropping funnel, a nitrogen inlet and a condenser. Then, 0.92 g of a nonionic surfactant Emulgen™ 930 (manufactured by Kao Corporation) dissolved in 250 ml of distilled water was added thereto at once under slowly stirring in a nitrogen atmosphere. Next, 91.6 g of methyl methacrylate was added thereto and the resulting mixture was vigorously stirred for several seconds to mix the contents with each other thoroughly. Subsequently, an initiator comprising 1.43 g of tert-butyl hyroperoxide and 15.0 g of tetraethylenepentamine dissolved in 50 ml of distilled water was added thereto and the mixture was reacted at 30° C. for 3 hours. After the completion of the reaction, the latex, which had been solidified, was extracted successively with petroleum ether and a solvent mixture of acetone with methanol (2:1) to separate thereby the unreacted natural rubber, a homopolymer and a graft copolymer from each other. It was confirmed by FT-IR and NMR that each of these substances was isolated.

EXAMPLES 1 AND 2

Production of Graft-copolymerized Natural Rubber

The procedure of the above Example 1 was repeated except for using the deproteinized rubber latex (solid content: 60%) obtained in the above Referential Example 2 or the deproteinized rubber latex (solid content: 60%) obtained in the above Referential Example 3. Thus, a graft copolymer was obtained in each case.

COMPARATIVE EXAMPLE 1

Production of Graft-copolymerized Natural rubber)

A high-ammonia type latex obtained from Guthrie, Malaysia was diluted to give a rubber concentration of 30% and then concentrated to 60% by centrifugation. By using the natural rubber latex (solid content: 61%) having a nitrogen content of 0.16% thus obtained, the procedure of the above Example 1 was repeated to thereby give a graft copolymer.

COMPARATIVE EXAMPLE 2

Production of Graft-copolymerized Natural Rubber

By using a natural rubber latex (solid content: 61%) obtained from Guthrie, Malaysia, having a nitrogen content of 0.34%, the procedure of the above Example 1 was repeated to give thereby a graft copolymer.

The graft ratio and the graft efficiency of each of the graft copolymers obtained in the above Examples and Comparative Examples were determined in accordance with the following formulae to evaluate thereby the degree of polymerization.

$$\text{Graft ratio} = \frac{\text{weight (g) of graft-polymerized monomers}}{\text{weight (g) of main chain polymer}} \times 100$$

$$\text{Graft efficiency} = \frac{\text{weight (g) of graft-polymerized monomers}}{\text{weight (g) of total polymerized monomers}} \times 100$$

In this instance, the "weight of main chain polymer" means the dry weight of the natural rubber particles (solid content) in the natural rubber latex. The "weight of total polymerized monomers" means the value obtained by subtracting the weight of unreacted monomers from the weight of the all monomers added (the sum of the dry weight of the natural rubber particles (solid content) in the natural rubber latex and the weight of the all monomer compounds added). The "weight of graft-polymerized monomers" means the value obtained by subtracting the sum of the weight of unreacted monomers and the weight of a homopolymer from the weight of the all monomers added. The weight of the unreacted monomers can be obtained by subtracting the dry weight of the reaction product (i.e., the weight of the reaction product after drying it to remove volatile components (water and monomer compounds)). The weight of the homopolymer can be obtained by extracting the reaction product with, for example, petroleum ether using a Soxhlet's extractor for 24 hours, and further extracting the residue with, for example, a acetone/methanol (2/1) mixed solvent using a Soxhlet's extractor for 24 hours, followed by measuring the weight of the extracts in the second extraction.

Table 1 shows the graft ratios and the graft efficiencies thus determined and the nitrogen contents of the natural rubbers employed.

TABLE 1

| | N content (%) | Graft ratio (%) | Graft efficiency (%) |
|---|---|---|---|
| Example 1 | 0.008 | 33.4 | 66.2 |
| Example 2 | 0.05 | 32.5 | 65.4 |
| Example 3 | 0.10 | 26.5 | 62.7 |
| Comparative Example 1 | 0.16 | 22.4 | 59.1 |
| Comparative Example 2 | 0.34 | 21.2 | 59.4 |

As Table 1 shows, the samples of the Examples with a nitrogen content reduced to 0.10% or below are superior in the graft ratio and the graft efficiency to the samples of the Comparative Examples with a higher nitrogen content.

EXAMPLE 4

Production of Epoxidized Natural Rubber 300 g of the deproteinized natural rubber latex (solid content: 60%) obtained in the above Referential Example 1 was fed into a three-necked flask equipped with a stirrer, a dropping funnel and a condenser. Then, 5.4 g of a nonionic surfactant Emulgen™ 106 (manufactured by Kao Corporation) dissolved in 300 ml of distilled water was added thereto under slowly stirring. Next, the pH value of the mixture was adjusted to the neutrality by adding acetic acid. Then, it was heated to 40° C. and 30.6 g of formic acid was added under stirring. Further, it was heated to 50° C. and 166.8 g of hydrogen peroxide (a 39% aqueous solution) was added over 20 minutes. After reacting at room temperature for 5 hours, an epoxidized rubber was obtained.

EXAMPLE 5

Production of Epoxidized Natural Rubber

The procedure of the above Example 4 was repeated except for using 40.0 g of acetic acid instead of formic acid. Thus, an epoxidized rubber was obtained.

EXAMPLE 6

Production of Epoxidized Natural Rubber

The procedure of above Example 4 was repeated except for using the deproteinized rubber latex obtained in the above Referential Example 3. Thus, an epoxidized rubber was obtained.

COMPARATIVE EXAMPLE 3

Production of Epoxidized Natural Rubber

A high-ammonia type latex obtained from Guthrie, Malaysia was diluted to give a concentration of 30% and then concentrated to 60% by centrifugation. By using the natural rubber latex (solid content: 61%) having a nitrogen content of 0.16% thus obtained, the procedure of the above Example 4 was repeated to give thereby an epoxidized rubber.

COMPARATIVE EXAMPLE 4

Production of Epoxidized Natural Rubber

By using a natural rubber latex (solid content: 61%) obtained from Guthrie, Malaysia, having a nitrogen content of 0.34%, the procedure of the above Example 4 was repeated to give thereby an epoxidized rubber.

The epoxidation ratio of each of the epoxidized rubber samples obtained in the above Examples and Comparative Examples was determined by FT-IR and $^{13}$C-NMR. The determination was performed in accordance with the manner as disclosed in "Chemical Demonstration of the Randomness of Epoxidized Natural Rubber", Br. Polym. J., 1984, 16, 134 (Davey et al.). The plasticity of each of the epoxidized rubber samples was measured by Wallance Rapid Plastimeter. Table 2 summarizes the results.

TABLE 2

| | N content (&) | Peracid | Epoxidation ratio (%) | Gel Content in Toluene | Plasticity |
|---|---|---|---|---|---|
| Example 4 | 0.008 | performic acid | 30.2 | 8 | 42.1 |
| Example 5 | 0.008 | peracetic acid | 29.5 | 10 | 47.5 |
| Example 6 | 0.10 | performic acid | 26.0 | 20 | 58.9 |
| Comparative Example 3 | 0.16 | performic acid | 24.3 | 40 | 70.2 |
| Comparative Example 4 | 0.34 | performic acid | 24.2 | 42 | 71.3 |

As Table 2 shows, the samples of the Examples with a nitrogen content reduced to 0.10% or below are superior in the epoxidation ratio and decrease in the gel content and plasticity as compared to those of the Comparative Examples with a higher nitrogen content.

EXAMPLE 7

Production of Graft-copolymerized Natural Rubber 300 g of the deproteinized natural rubber latex (solid content: 60%) obtained in the above Referential Example 1 and 300 g of distilled water were fed into a four-necked flask equipped with a stirrer, a dropping funnel, a nitrogen inlet and a condenser. Then, 23.6 g of styrene, 0.3 g an anionic surfactant Emal™ E-70C (manufactured by Kao Corporation), and 0.16 g of ter-butyl hydroperoxide were added thereto while stirring the mixture in a nitrogen atmosphere and the resulting mixture was heated to 50° C. After heating the mixture at the same temperature for 20 minutes, 4 g of a 10% aqueous solution of tetraethylenepentamine was added thereto and reaction was proceeded for 40 minutes. The procedure from the addition of styrene to the reaction with tetraethylenepentamine was repeated three times in total and then the resulting reaction mixture was further allowed to react at 50° C. for 3 hours. The resulting latex was almost free from aggregations. The latex was freeze dried and then extracted in a similar manner as in Example 1 with hexane and ethyl acetate to separate thereby the unreacted natural rubber, a homopolymer and a graft copolymer from each other. It was confirmed by FT-IR and NMR that each of these substances was isolated.

EXAMPLES 8 AND 9

Production of Graft-copolymerized Natural Rubber

The procedure of the above Example 7 was repeated except for using the deproteinized rubber latex (solid content: 60%) obtained in the above Referential Example 2 or the deproteinized rubber latex (solid content: 60%) obtained in the above Referential Example 3. Thus, a graft copolymer was obtained in each case.

COMPARATIVE EXAMPLE 5

Production of Graft-copolymerized Natural Rubber

By using a natural rubber latex (solid content: 61%) obtained from Guthrie, Malaysia, having a nitrogen content of 0.34%, the procedure of the above Example 7 was repeated to give thereby a graft copolymer.

The graft ratio and the graft efficiency of each of the graft copolymers obtained in the above Examples 7 to 9 and Comparative Example 5 were determined in the manner described above. Table 3 shows the graft ratios and the graft efficiencies thus determined and the nitrogen contents of the natural rubbers employed.

TABLE 3

| | N content (%) | Graft ratio (%) | Graft efficiency (%) |
|---|---|---|---|
| Example 7 | 0.008 | 36.7 | 91.7 |
| Example 8 | 0.05 | 35.3 | 88.2 |
| Example 9 | 0.10 | 30.1 | 75.3 |
| Comparative Example 5 | 0.34 | 24.2 | 60.5 |

According to the modified natural rubber and the process for producing the same of the present invention, a natural rubber which has been deproteinized so as to give a nitrogen content of less than 0.10% by weight is modified by, for example, graft copolymerization or epoxidation. Thus a high modifying efficiency can be achieved and, therefore, an excellent modifying effect can be obtained. Also, the modified natural rubber of the present invention, which is substantially free from any-protein, is useful as a means for preventing allergy.

While the invention has been described in detail and with reference to specific examples thereof, it will be apparent to one skilled in the art that various changes and modifications can be made therein without departing from the spirit and scope thereof.

What is claimed is:

1. A modified natural rubber obtained by a modification of a deproteinized natural rubber having a nitrogen content of less than 0.10% by weight; wherein said modification is either of:

A) graft copolymerizing said deproteinized natural rubber with 2-hydroxyethyl methacrylate, said modified natural rubber having a graft efficiency of 62.7% or more; or B) epoxidizing said deproteinized natural rubber with trifluoroperacetic acid, wherein an epoxidation rate is sufficient to produce a modified deproteinized natural rubber having an epoxidation ratio of 26.0% or more in 5 hours.

2. A modified natural rubber obtained by a modification of a deproteinized natural rubber having a nitrogen content of less than 0.10% by weight; wherein said modification is a graft copolymerization of said deproteinized natural rubber with methyl methacrylate in the presence of t-butyl hydroperoxide, and tetraethylenepentamine, said modified natural rubber having a graft efficiency of 62.7% or more.

3. A modified natural rubber obtained by a modification of a deproteinized natural rubber having a nitrogen content of less than 0.10% by weight; wherein said modification is an epoxidation of the deproteinized natural rubber with hydrogen peroxide and formic acid or glacial acetic acid, wherein an epoxidation rate is sufficient to produce a modified deproteinized natural rubber having an epoxidation ratio of 26.0% or more in 5 hours.

4. A modified natural rubber obtained by a modification of a deproteinized natural rubber having a nitrogen content of less than 0.10% by weight; wherein said modification is a graft copolymerization of said deproteinized natural rubber with styrene in the presence of t-butyl hydrperoxide, and traethylenepentamine, said modified natural rubber having a graft efficiency of 62.7% or more.

* * * * *